US006410908B1

(12) United States Patent
Anderson et al.

(10) Patent No.: US 6,410,908 B1
(45) Date of Patent: Jun. 25, 2002

(54) FIBER OPTIC SIGNAL-RECEIVING SYSTEM REMOVABLY CONNECTED TO A HEADRAIL HOUSING

(75) Inventors: Richard N. Anderson, Whitesville, KY (US); Donald E. Fraser, St. Petersburg, FL (US); Everett S. Coleman, Owensboro, KY (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 0 days.

(21) Appl. No.: 09/481,746

(22) Filed: Jan. 11, 2000

Related U.S. Application Data

(60) Provisional application No. 60/138,743, filed on Jun. 11, 1999, provisional application No. 60/126,104, filed on Mar. 25, 1999, and provisional application No. 60/115,393, filed on Jan. 11, 1999.

(51) Int. Cl.[7] .................................................... G01J 1/04
(52) U.S. Cl. ............. 250/227.11; 250/239; 250/214 AL
(58) Field of Search ........................ 250/227.11, 227.14, 250/227.24, 239, 216, 214 AL, 214 D, 203.4; 160/161, 181; 340/555–557

(56) References Cited

U.S. PATENT DOCUMENTS

| | | | | |
|---|---|---|---|---|
| 4,623,012 A | | 11/1986 | Rude et al. | |
| 5,228,491 A | | 7/1993 | Rude et al. | |
| 5,413,161 A | * | 5/1995 | Corazzini | 160/7 |
| 5,495,153 A | | 2/1996 | Domel et al. | |
| 5,662,154 A | | 9/1997 | Drake, III | |

FOREIGN PATENT DOCUMENTS

| | | |
|---|---|---|
| AU | 76262/91 | 11/1991 |
| CA | 2162443 | 5/1996 |
| DE | 82239134 | 1/1983 |
| DE | 29508479 | 9/1995 |
| GB | 2076454 | 9/1983 |
| NZ | 161962 | 2/1972 |

* cited by examiner

*Primary Examiner*—Que T. Le
(74) *Attorney, Agent, or Firm*—Dorsey & Whitney LLP

(57) ABSTRACT

A fiber optic cable, signal-receiving system 10 is disclosed. The system 10 includes an exposed signal receiver 28, 80 for receipt of remote-control signals from a remote-control transmitter. In a first embodiment, the signal receiver comprises a signal refractor 28 that bends the remote-control signals toward a collector 58 hidden within the headrail housing 18. In an alternative embodiment, the signal receiver comprises a remote eye 80 that positions the collector 58 for direct receipt of the remote-control signals. The signal refractor 28 or the remote eye 80 is mounted adjacent to a lowest edge of a headrail, valance, or over treatment for a window covering. The remote-control transmitting device thus generates signals that impinge upon the collector 58 of the remote eye 80 or upon the signal refractor 28, and which are subsequently transmitted via fiber optic cable 90 to receiver electronics 66 hidden within the headrail housing 18 for further processing and interpretation. The signal-receiving system 10 of the present invention permits the bulk of the system components, including, for example, the receiver electronics 66, to be hidden. The relatively small signal receiver 28, 80 of the system 10 is the only clearly visible component from exteriorly of the headrail.

41 Claims, 13 Drawing Sheets

FIBER OPTIC SIGNAL-RECEIVING SYSTEM REMOVABLY CONNECTED TO A HEADRAIL HOUSING

CROSS-REFERENCE TO RELATED APPLICATIONS

This application is related and claims priority to United States provisional application Ser. No. 60/115,393, filed Jan. 11, 1999, and entitled "Window Blind with Motorized Tilt Control"; and Ser. No. 60/126,104, filed Mar. 25, 1999, and entitled "Motorized Blind." It is also related and claims priority to United States provisional application Ser. No. 60/138,743, filed Jun. 11, 1999, and entitled "Headrail Including a Detachable Battery Holder for Powered Coverings for Architectural Openings." The present application is also related to U.S. application Ser. No. 09/481,237, filed Jan. 11, 2000, entitled "Headrail Including a Detachable Battery Holder for Powered Coverings for Architectural Openings"; Ser. No. 09/480,913, filed Jan. 11, 2000, entitled "Headrail Including a Trap Door for Accessing Batteries for Powered Coverings for Architectural Openings"; Ser. No. 09/480,912, filed Jan. 11, 2000, entitled "System for Holding Batteries in a Headrail for Powered Coverings for Architectural Openings"; and Ser. No. 09/481,307 filed Jan 11, 2000, entitled "Headrail and Control System for Powered Coverings for Architectural Openings," all of which are being filed concurrently herewith. Each of these related applications (namely; the '393, '104, '743, '237, '913, '912, and '307 applications) is hereby incorporated by reference as though fully set forth herein.

BACKGROUND OF THE INVENTION a. Field of the Invention

The instant invention is directed toward a signal-receiving system employing fiber optic cable. More specifically, it relates to a signal-receiving system for use in a motorized adjustable covering for an architectural opening.

b. Background Art

It is well known to use adjustable coverings over architectural openings. Such adjustable coverings include cellular panels, Venetian blinds, and many other mechanisms for controlling the passage of light, vision, or air through the architectural openings. For example, cellular panels and Venetian blinds may be adjusted by retracting or extending them, and Venetian blinds may be further adjusted by tilting slats comprising part of the blind. Depending upon the specific type of mechanism, other adjustments are also possible.

It is also known in the art to power these adjustable coverings. For example, electric motors may be used in connection with an adjustable covering to facilitate retracting the covering or otherwise adjusting the covering to control the amount of light, vision, or air that may pass through the covering. In applications where access to the architectural covering may be limited, remote controls have been successfully used to operate the electric motors that allow a user to selectively configure the covering. For example, when architectural coverings are used in connection with elevated architectural openings, it may be quite inconvenient to manually change the configuration of the coverings.

Heretofore systems used to receive electromagnetic remote-control signals, e.g., infrared or visible signals, have been obtrusive and at times unreliable. Thus, there remains a need for a more reliable, compact, and unobtrusive system for receiving signals transmitted from a remote-control device.

SUMMARY OF THE INVENTION

The fiber optic cable, signal-receiving system of the present invention is adapted to be removably connected to a headrail housing for a motorized covering for an architectural opening. The signal-receiving system includes receiver electronics, a receiver holder that supports the receiver electronics and that is adapted to be removably affixed within the headrail housing, and a signal receiver operatively connected to the receiver electronics. The present invention has been designed such that the large components of the system may be hidden within the headrail housing while a small, unobtrusive signal receiver for actually receiving the remote-control signal and directing it toward the hidden large components projects from an edge of the headrail housing, valance, or over treatment for the motorized covering.

In a first preferred form, the signal receiver comprises a signal refractor that bends the remote-control signals toward a collector hidden within the headrail housing. In an alternative preferred form, the signal receiver comprises a remote eye that positions the collector for direct receipt of the remote-control signals. Fiber optic cable is operatively associated with the collector in both preferred forms. Also, the signal refractor or the remote eye preferably is mounted adjacent to a lowest edge of a headrail, valance, or over treatment for the window covering. The remote-control transmitting device thus generates signals that impinge upon the signal refractor or upon the collector of the remote eye, and which are subsequently transmitted via fiber optic cable to receiver electronics hidden within the headrail housing for further processing and interpretation. The signal-receiving system of the present invention thus permits the bulk of the system components to be hidden from view. The relatively small signal receiver of the system is the only clearly visible component from exteriorly of the headrail.

In a preferred form, the receiver holder, which may include a receiver holder base and a receiver holder cover, comprises at least one brace adapted to position the receiver holder within the headrail housing. In particular, the headrail housing may have a rear wall with a distal edge, and the brace may comprise a free end adapted to interact with the distal edge of the rear wall to snappingly position the receiver holder within the headrail housing. The receiver holder base and cover each has longitudinal ends. A pair of cover anchors may extend from the longitudinal ends of the receiver holder base, and a corresponding pair of catches may extend downwardly from the longitudinal ends of the receiver holder cover such that when the receiver holder cover is pressed into position on the receiver holder base, the catches snap past the cover anchors to removably secure the receiver holder cover to the receiver holder base. The receiver holder base may further comprise a bottom surface having a scoop extending therefrom.

When the signal receiver comprises a signal refractor, the signal refractor may have a first surface at its lower end. In a preferred form, when the signal refractor is in an operational position, the first surface is sloped relative to the horizontal. Preferably, the first surface forms an angle of approximately 45° with the horizontal when the signal refractor is in the operational position. The signal refractor may also have a front surface that may be sloped relative to the vertical when the signal refractor is in the operational position. In yet another preferred form, the signal refractor includes a substantially horizontal channel into which an inwardly directed substantially horizontal ledge extending from the lowest edge of the front wall of the headrail housing is disengageably received.

When the signal receiver comprises a remote eye, it may be removably affixed to the valance or over-treatment designed to substantially concealing the headrail housing. In a preferred form, the remote eye comprises a housing with a collector positioned therein. In particular, the housing may comprise an upper half and a lower half, and the collector may extend outwardly through an opening in the lower half of the housing. A collector tray may be formed within the lower half of the housing, to prevent the collector from passing completely through the opening that accommodates the collector. One or more cable cradles also may be formed inside of the remote eye housing to removably support a portion of fiber optic cable extending into the remote eye. There may be a rib formed on the exterior of the remote eye housing that cooperates with a generally U-shaped clamp or clip to removably attach the remote eye to a mounting surface (e.g., to a valance or over-treatment). For example, the clip may include an inner surface having a plurality of gripping ridges formed thereon to removably hold the remote eye to an over-treatment. A retention nub and flexible brace may comprise part of the clip to help releasably support the remote eye.

Other aspects, features, and details of the present invention will be apparent from reading the following description and claims and from reviewing the accompanying drawings.

DESCRIPTION OF THE PREFERRED EMBODIMENTS

Preferred embodiments for a signal-receiving system 10 for motorized adjustable coverings 12 for architectural openings are disclosed. The present invention comprises an unobtrusive means for reliably receiving the signal from a remote control transmitter (not shown). An advantage of the instant invention over the prior art is that a relatively small component mounted to the headrail, valance, or over treatment is the only part of the signal-receiving system 10 that remains in plain view, and the remaining components of the system 10 are hidden within the headrail 14. The signal is thus transferred from the small exposed component to a controller for the motor that actually adjusts the covering 12.

Figure 1:
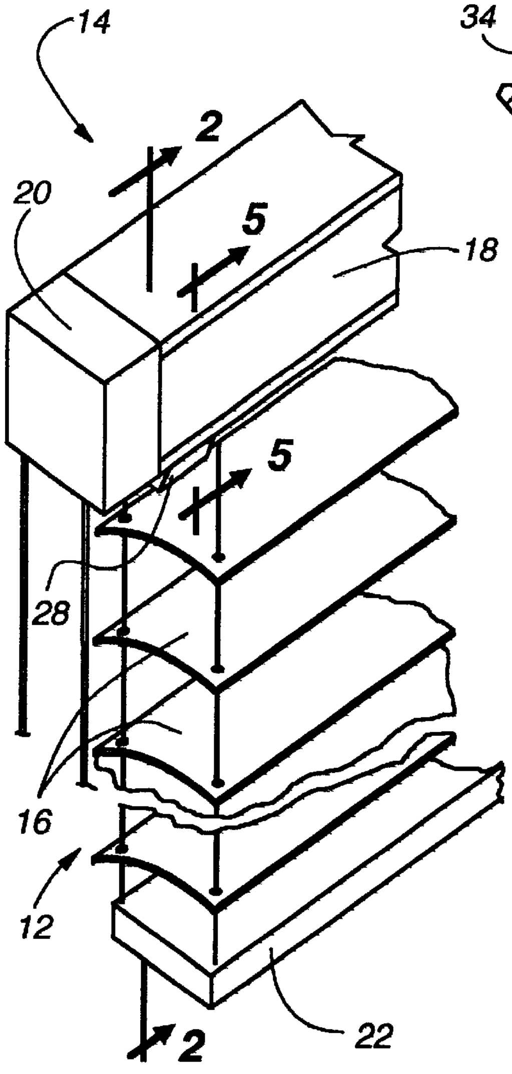
FIG. 1 is a fragmentary isometric view showing the front, top, and left end of a headrail, adjustable covering, and bottom rail for an architectural opening.

Referring first to FIG. 1, a fragmentary isometric view of the front top and left end of a headrail 14 and an adjustable covering 12 for an architectural opening is shown. Although the adjustable covering 12 depicted in FIG. 1 is a Venetian blind comprising a plurality of slats 16, for purposes of the instant invention, the particular type of covering 12 is unimportant. FIG. 1, therefore, provides a context for describing the present invention. In the Venetian blind covering 12 of FIG. 1, an electric motor (not shown) within a housing 18 of the headrail 14 may be used, for example, to regulate the passage of air, light, or vision through the substantially horizontal slats 16 of the covering 12 by selectively tilting or rotating the slats 16 about their longitudinal axes. As depicted in FIG. 1, the headrail 14 has a left end cap 20 attached to a left end of the housing 18. Also as shown in FIG. 1, a bottom rail 22 is attached to the bottom of the covering 12.

Figure 2:
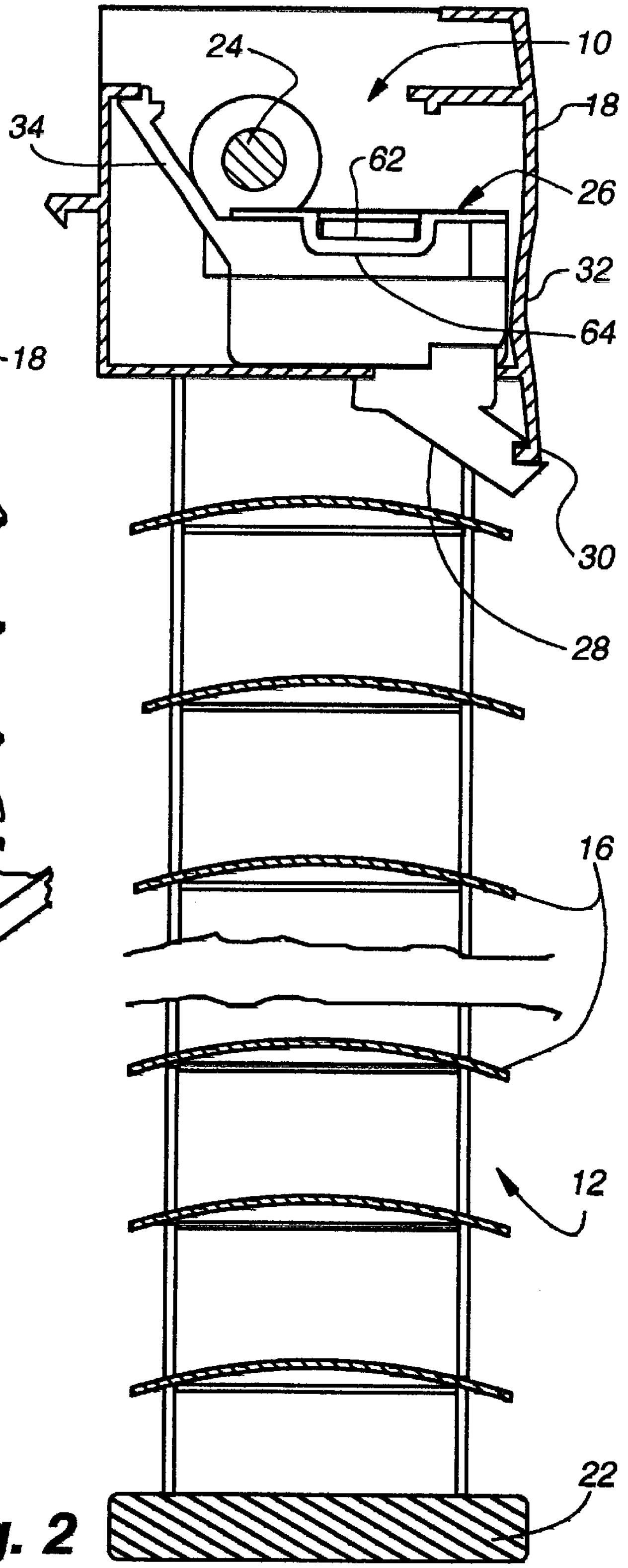
FIG. 2 is a fragmentary cross-sectional view taken along line 2—2 of FIG. 1, depicting a signal receiver according to the present invention mounted to the headrail housing.

FIG. 2 is a fragmentary cross-sectional view along line 2–2 of FIG. 1, depicting the inside of the headrail housing 18 with the left end cap 20 removed. A tilt rod 24, which would be used to selectively adjust the configuration of the covering 12, is shown schematically in FIG. 2. Since FIG. 2 is a view looking inside of the headrail 14 with the left headrail end cap 20 removed, it is possible to see a receiver holder 26 positioned within the headrail 14 and a signal refractor 28, which is attached to a bottom of the receiver holder 26, in position adjacent to a lowest edge 30 of a front wall 32 of the headrail housing 18.

Figure 3:
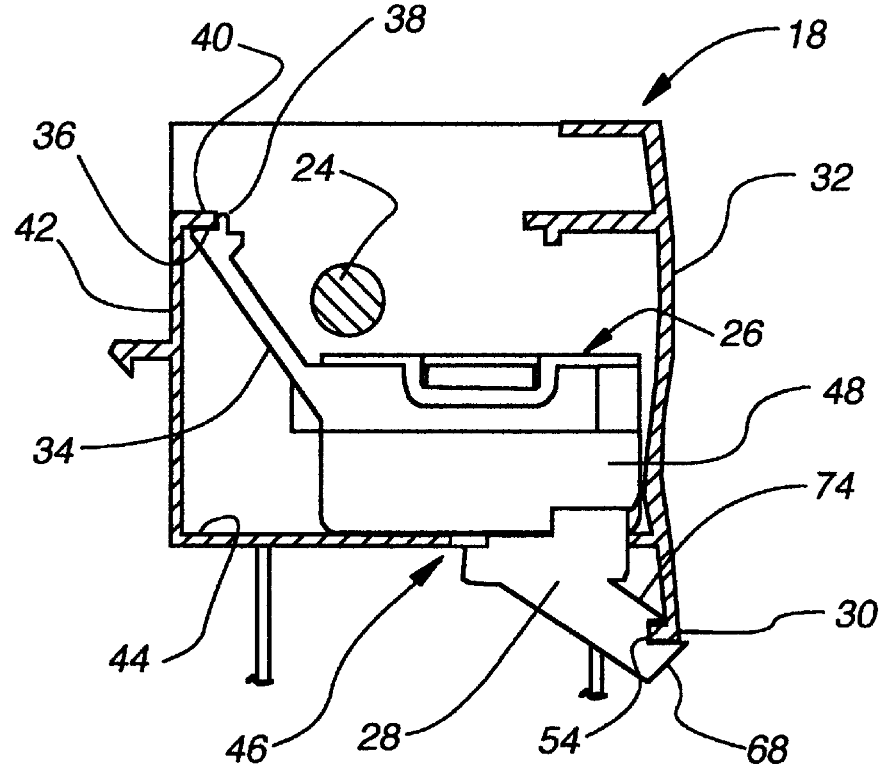
FIG. 3 is an enlarged view of a portion of FIG. 2.

FIG. 3 is an enlarged view of a portion of FIG. 2. In this preferred embodiment, the receiver holder 26 is held in position within the headrail housing 18 by a pair of braces 34 (one of which is visible in FIG. 3). The pair of braces 34 are most clearly visible in FIGS. 8. and 9. The free end of each brace 34 comprises a substantially horizontal surface 36 that is bifurcated by an upstanding ridge 38. When the headrail housing 18 has the cross-sectional configuration depicted in FIGS. 2 and 3, a distal edge 40 of a rear wall 42 of the housing 18 extends substantially horizontally into the interior of the headrail housing 18. This distal edge 40 of the rear wall 42 presses against the rear side of the upstanding ridge 38 on the free end of each brace 34 to position the receiver holder 26 within the housing 18. As will be described further in connection with FIGS. 6–9, the headrail housing 18 includes a bottom wall 44 having a port 46 through it. As described in more detail below in connection with FIGS. 6–9, the receiver holder 26 includes a receiver holder base 48 having a scoop 50 extending from a bottom surface 52 thereof. The interaction between the scoop 50 and the port 46 also helps to position the receiver holder 26 within the headrail housing 18. As will be described further below in connection with FIGS. 10 and 11, the signal refractor 28 of the preferred embodiments includes a substantially horizontal channel 54 (most clearly depicted in FIGS. 10 and 11). This substantially horizontal channel 54 accommodates an inwardly directed substantially horizontal ledge 56 extending from the lower edge 30 of the front wall 32 of the headrail housing 18.

Figure 4:
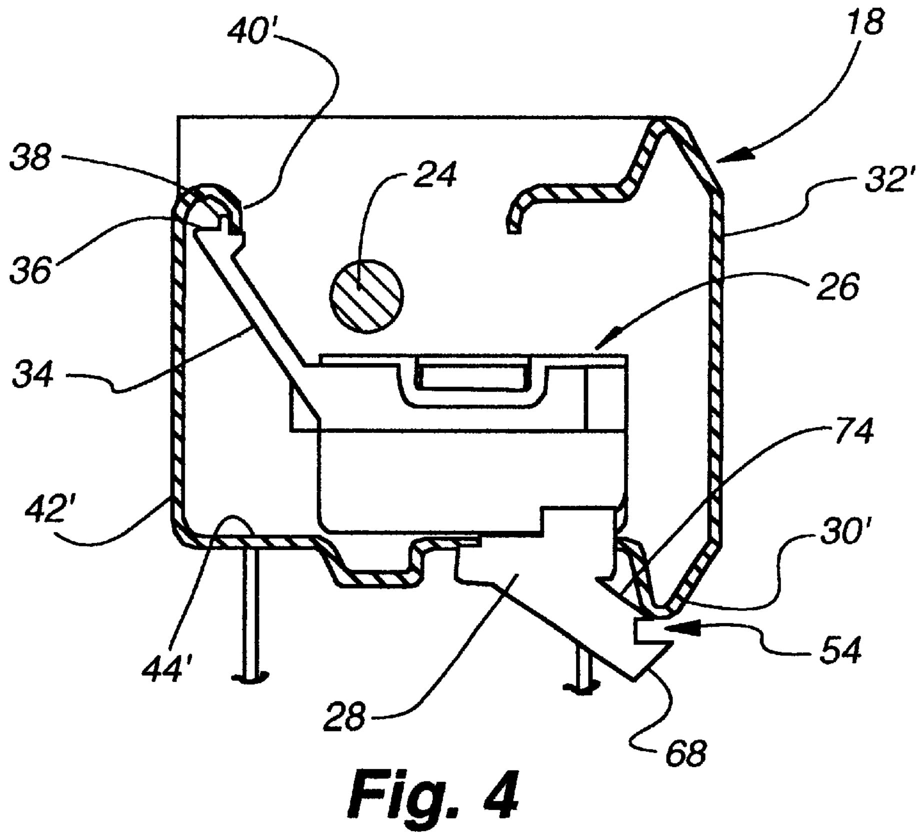
FIG. 4 is similar to FIG. 3, but depicts a first alternative cross-sectional configuration for the headrail housing.

FIG. 4 is similar to FIG. 3, but depicts a first alternative cross-sectional configuration for the headrail housing 18'. In this configuration, the receiver holder 26 is positioned within the headrail housing 18 in a slightly different manner. In particular, the free end of each brace 34 is stabilized by the rear wall 42' in a manner that is different from that described with reference to FIG. 3. When the headrail housing 18' has the configuration depicted in FIG. 4, the distal edge 40' of the rear wall 42' extends downwardly. When the receiver holder 26 is positioned within the headrail housing 18', this distal edge 40' presses downwardly on a portion of the substantially horizontal surface 36 at the free end of each brace 34. As previously described in connection with FIG. 3, the bottom wall 44' of the headrail housing has a port 46 through it as clearly shown in FIG. 7. Again, interaction between the scoop 50 extending from the bottom surface 52 the receiver holder base 48 and the edges of the port 46 help to position the receiver holder 26 within the headrail housing 18'. The substantially horizontal channel 54 comprising part of the signal refractor 28 is not engaged by the lowest edges 30' of the front wall 32' when the headrail housing 18' has the cross-sectional configuration depicted in FIGS. 4 and 5.

Figure 5:
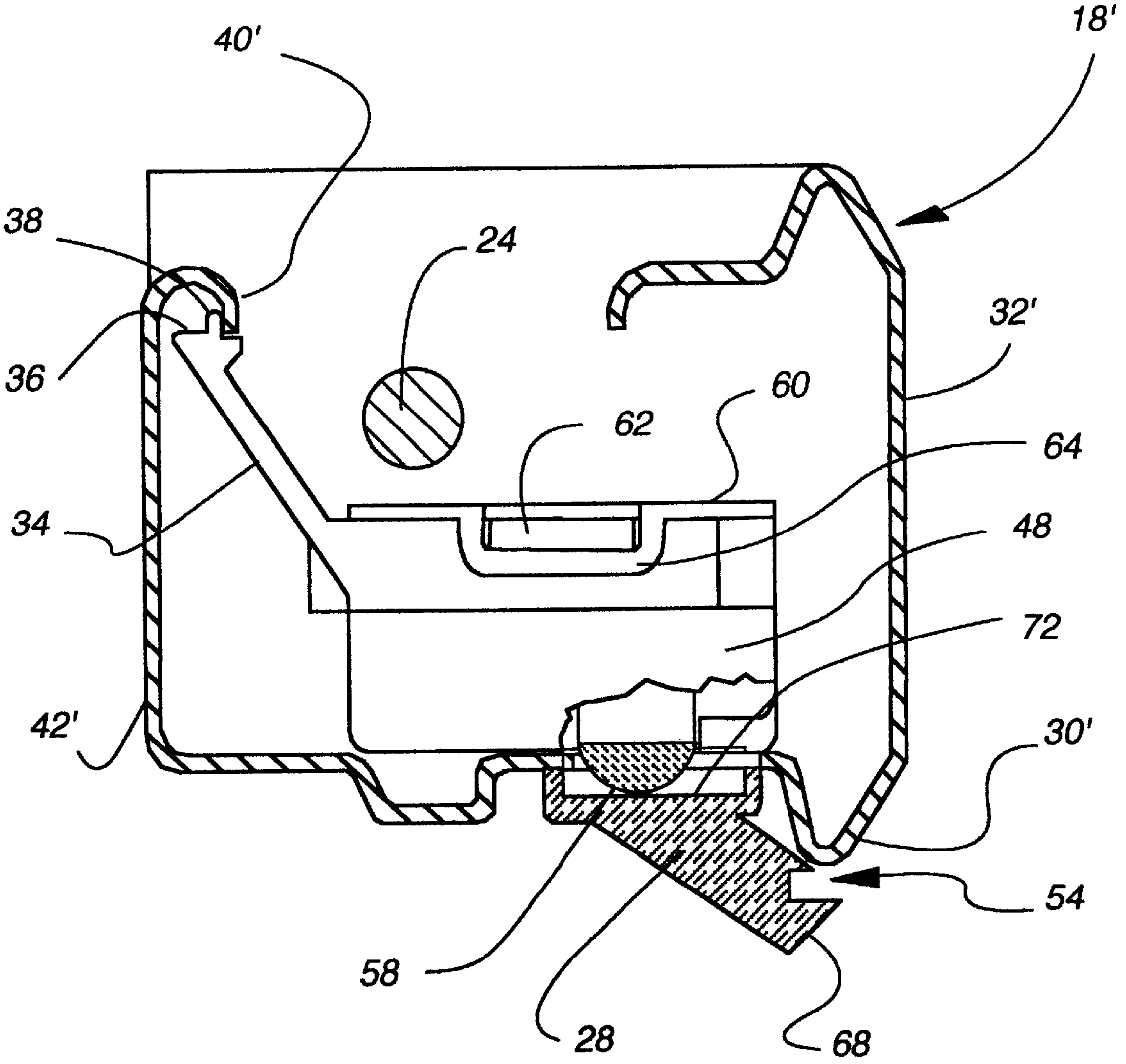
FIG. 5 is similar to FIG. 4, but depicts a portion of the receiver holder base broken away to depict the relationship between a collector mounted within the receiver holder base and a signal refractor mounted to a lower end of the receiver holder base.

FIG. 5 is similar to FIG. 4, but depicts a portion of the receiver holder base 48 broken away to depict the relationship between a collector 58 mounted within the receiver holder base 48 and the signal refractor 28 mounted to the scoop 50 (FIG. 9) extending from the bottom surface 52 of the receiver holder base 48. Also shown in FIG. 5 and as will be discussed further in connection with FIG. 9, the receiver holder 26 comprises the receiver holder base 48 and a receiver holder cover 60. A pair of cover anchors 62 extend from the longitudinal ends of the receiver holder base 48. Corresponding catches 64 extend downwardly from the longitudinal ends of the receiver holder cover 60. When the receiver holder cover 60 is pressed into position on the receiver holder base 48, these catches 64 snap past the cover anchors 62 and removably secure the receiver holder cover 60 to the receiver holder base 48, while protecting the receiver electronics 66 (FIG. 9) within the receiver holder 26.

Figure 7:
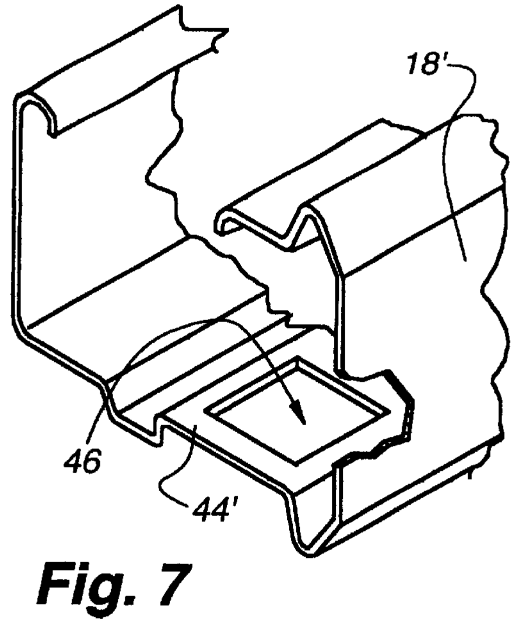
FIG. 7 is similar to FIG. 6, but depicts a fragmentary isometric view of a portion of the first alternative embodiment for the headrail housing also shown in FIG. 4, revealing a port through a bottom wall of the headrail housing.
Figure 8:
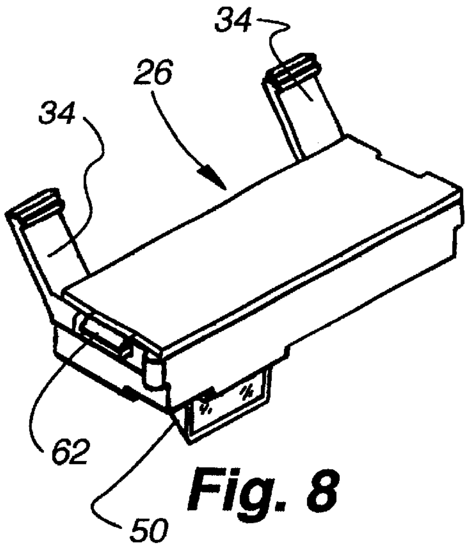
FIG. 8 is an isometric view of the signal receiver holder that is shown mounted within the headrail in, for example, FIGS. 2–5.
Figure 6:
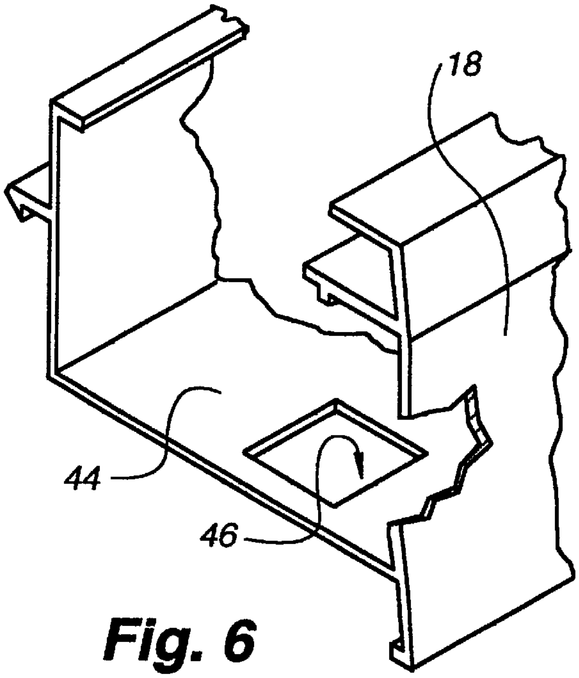
FIG. 6 is a fragmentary isometric view of a portion of the headrail housing also depicted in FIGS. 2 and 3, revealing a port through a bottom wall of the headrail housing.

Referring next to FIGS. 6 and 7, which are fragmentary isometric views of a portion of two different embodiments of the headrail housing 18, 18', respectively, a port 46 is clearly shown through the bottom wall 44, 44' of the headrail housing 18, 18'. As shown in FIG. 8, which is an isometric view of the signal receiver holder 26, the scoop 50 extends from the bottom surface 52 of the signal receiver holder base 48. When the signal receiver holder 26 is mounted within the headrail housing 18, 18' (see, e.g., FIGS. 2–5), the scoop 50 extends through the port 46 in the bottom wall 44, 44'. In this manner, the signal refractor 28, which is mounted within the scoop 50 as discussed in connection with FIG. 9, extends outside of the headrail housing 18, 18' and is positioned for reliable reception of remote-control signals.

Figure 9:
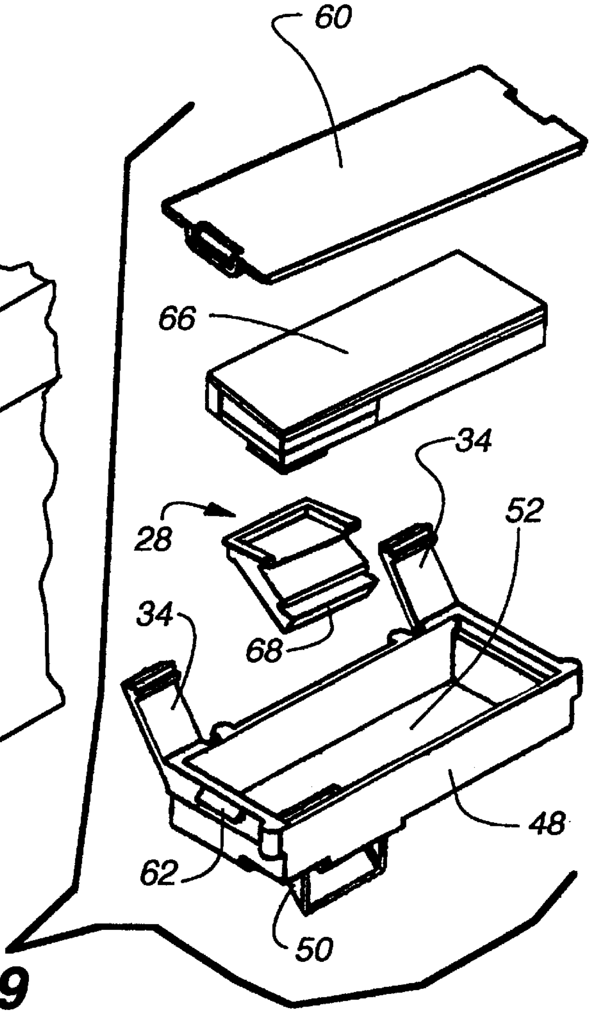
FIG. 9 is an exploded isometric view of the two-piece signal receiver holder, the signal receiver electronics, and the signal refractor.
Figure 11:
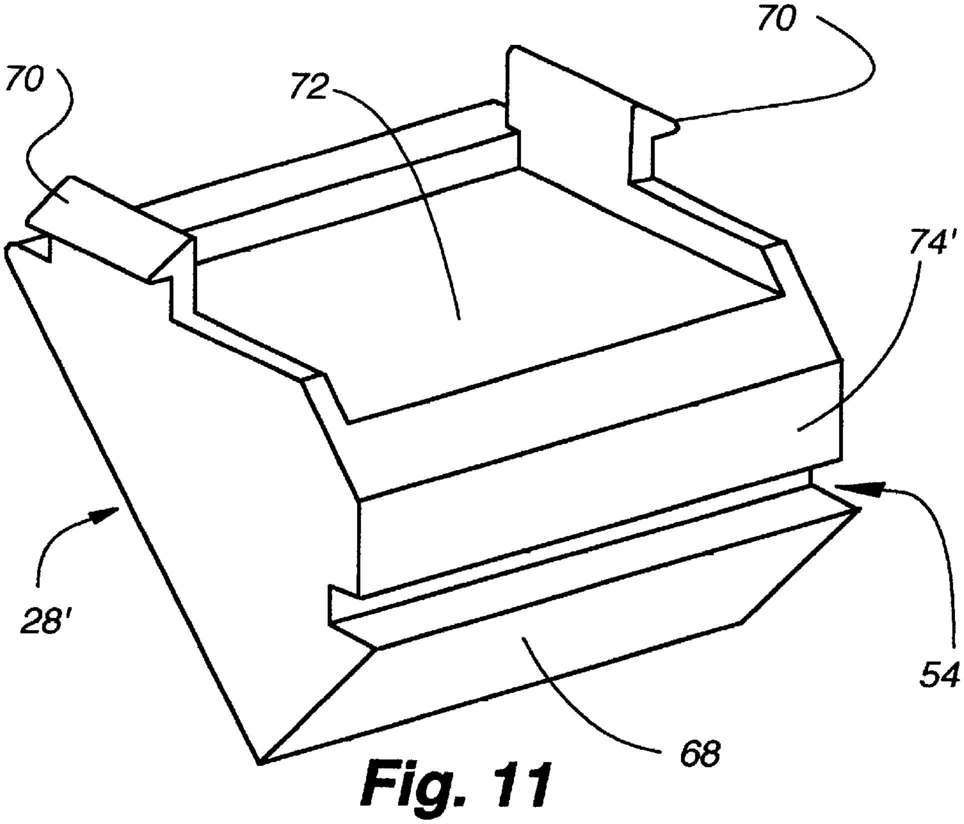
FIG. 11 is an isometric view of a first alternative embodiment for the signal refractor depicted in FIG. 10.
Figure 10:
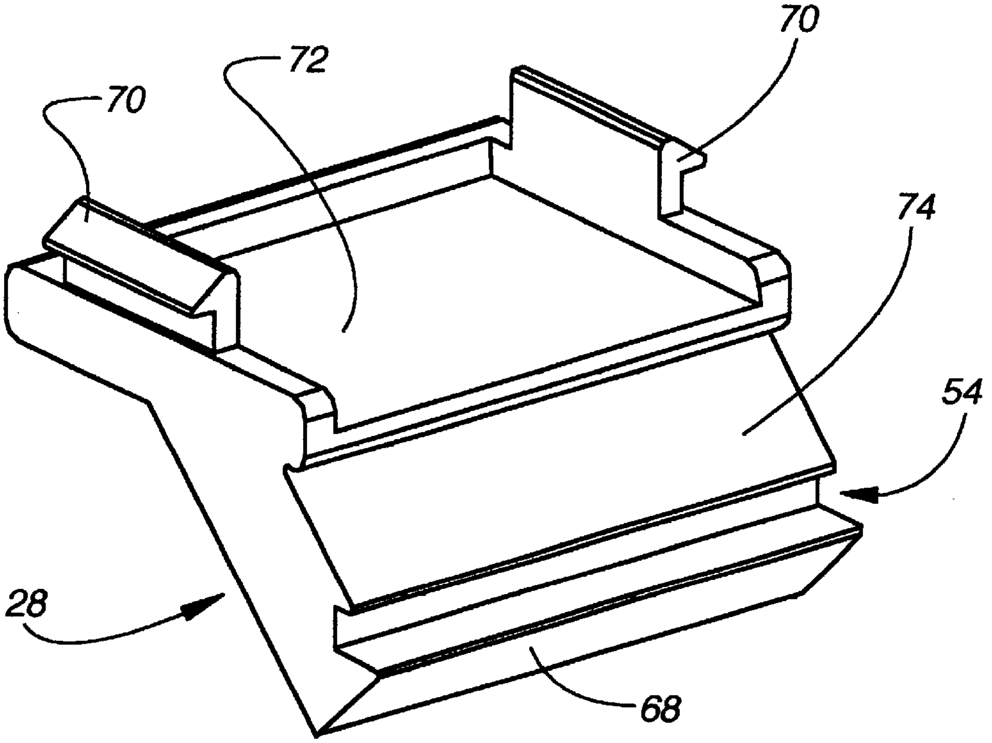
FIG. 10 is an isometric view of a preferred embodiment for the signal refractor also depicted in FIG. 9.

FIG. 9 is an exploded isometric view of the two-piece signal receiver holder 26, the signal receiver electronics 66, and the signal refractor 28. As briefly discussed above and as shown to good advantage in FIG. 9, the receiver holder cover 60 has a catch 64 at each of its longitudinal edges. One of these catches 64 is clearly visible in FIG. 9. Moving downward in FIG. 9, the receiver electronics 66 are shown schematically next. Below the receiver electronics 66, a most preferred embodiment of the signal refractor 28 is shown isometrically. This same signal refractor 28 is shown enlarged in FIG. 10. Finally, the receiver holder base 48 is depicted isometrically at the bottom of FIG. 9. In the preferred embodiment of the receiver holder base 48, a cover anchor 62 extends from each of the longitudinal edges. To assemble the receiver holder 26, the signal refractor 28 is first placed within the receiver holder base 48 so that a sloped surface 68 at a lower end of the signal refractor 28 extends through the scoop 50 mounted to the bottom surface 52 of the signal holder base 48. Referring to FIGS. 10 and 11, which depict two alternative embodiments of the signal refractor 28, 28', the positioning clips 70 formed on two of the edges of the upper surface 72 of the signal refractor 28 are clearly visible. These positioning clips 70 prevent the signal refractor 28, 28' from passing completely through the bottom surface 52 of the receiver holder base 48. When the signal refractor 28, 28' is fully inserted into the scoop 50, the positioning clips 70 rest on the bottom surface 52 of the receiver holder base 48 to properly position the signal refractor 28, 28'.

As just mentioned, FIGS. 10 and 11 are isometric view of two alternative embodiments for the signal refractor 28, 28'. The embodiment depicted in FIG. 10 is most preferred since it has a sloped front surface 74, which permits this signal refractor 28 to be compatible with a wide variety of cross-sectional shapes for the headrail housing 18, 18'. In contrast, the front surface 74' of the signal refractor 28' depicted in FIG. 11 is not sloped. Thus, although the signal refractors 28, 28' depicted in FIGS. 10 and 11 function similarly, the particular configuration depicted in FIG. 11 is less versatile than the configuration depicted in FIG. 10 and thus is less preferred. Each of the signal refractors 28, 28' includes a sloped surface 68. at its lower edge As will be described further below in connection with FIGS. 13A–13F and 14, the sloped surface 68 is the point of entry for remote control signal which are then bent toward the collector 58 as described below.

Figure 12:
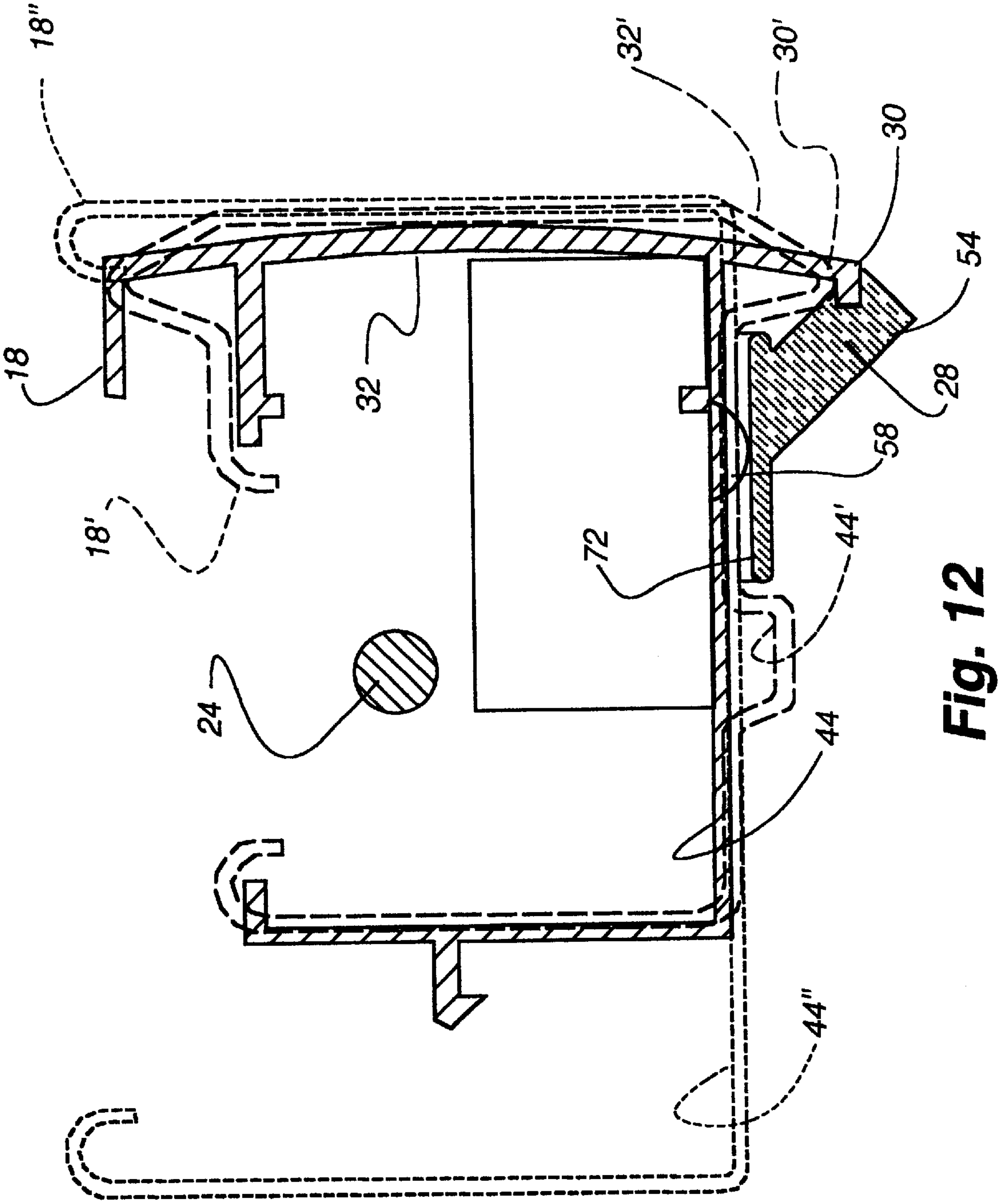
FIG. 12 is a schematic representation simultaneously depicting the signal refractor of FIG. 10 mounted in three alternative embodiments of the headrail housing.

FIG. 12 is a schematic representation that simultaneously depicts the signal refractor 28 of FIG. 10 mounted in three alternative embodiments of the headrail housing 18, 18', 18". As discussed above in connection with FIGS. 10 and 11, the most preferred embodiment for the signal refractor 28 is that shown in FIG. 10. As shown in FIG. 12, the specific configuration for the signal refractor 28 depicted in FIG. 10 cooperates with each of the three headrail housings 18, 18', 18" depicted in FIG. 12. As shown, in one alternative embodiment, the signal refractor 28 extends below the bottom wall 44" of the headrail housing 18" without touching it. When used in connection with a second embodiment for the headrail housing 18', the signal refractor 28 touches the lowest edge 30' of the front wall 32' of the headrail housing 18', but is not connected thereto. Finally, in the third cross-sectional configuration for the housing 18 depicted in FIG. 12, the substantially horizontal channel 54 of the signal refractor 28 engages the lowest edge 30 of the front wall 32 of the headrail housing 18. As is also shown in FIG. 12, the collector 58 is positioned at the upper surface 72 of the signal refractor 28. As will be described next in connection with FIGS. 13A–13F and 14, the collector 58 is positioned so that signals that are redirected by the signal refractor 28 impinge upon the collector 58, which then transmits the signals via fiber optic cable to the other control electronics.

Figure 13A:
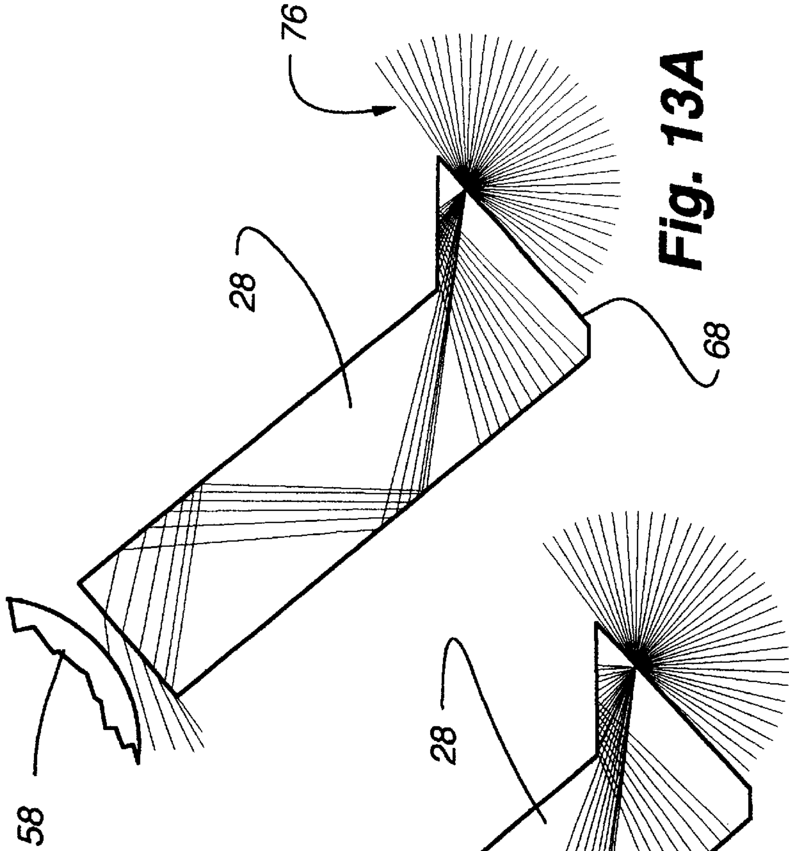
FIGS. 13A–13F are schematic representations of a signal refractor and collector depicting the path of light rays impinging at a plurality of locations along a sloped surface comprising part of the signal refractor.
Figure 13B:
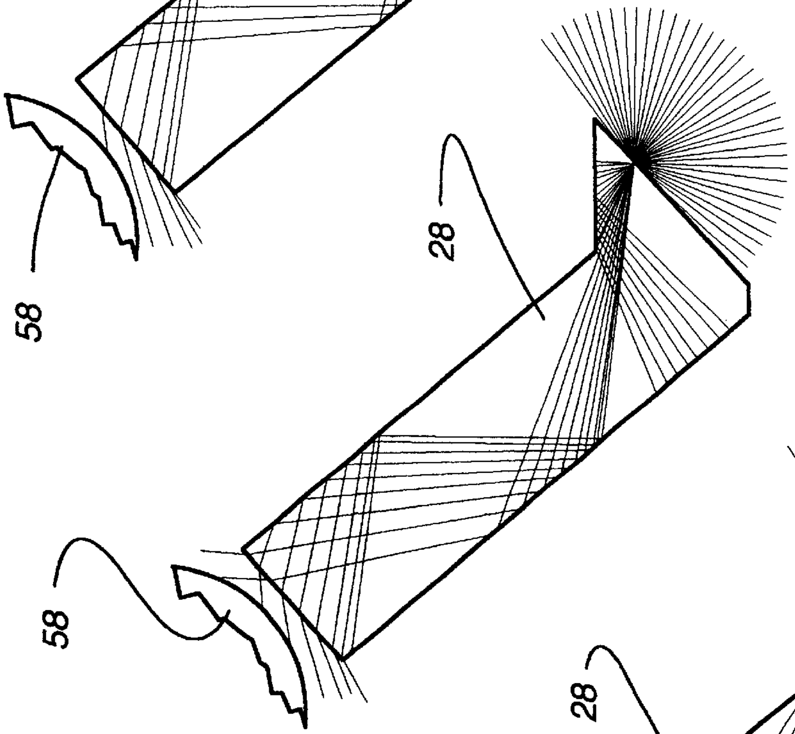
Figure 13C:
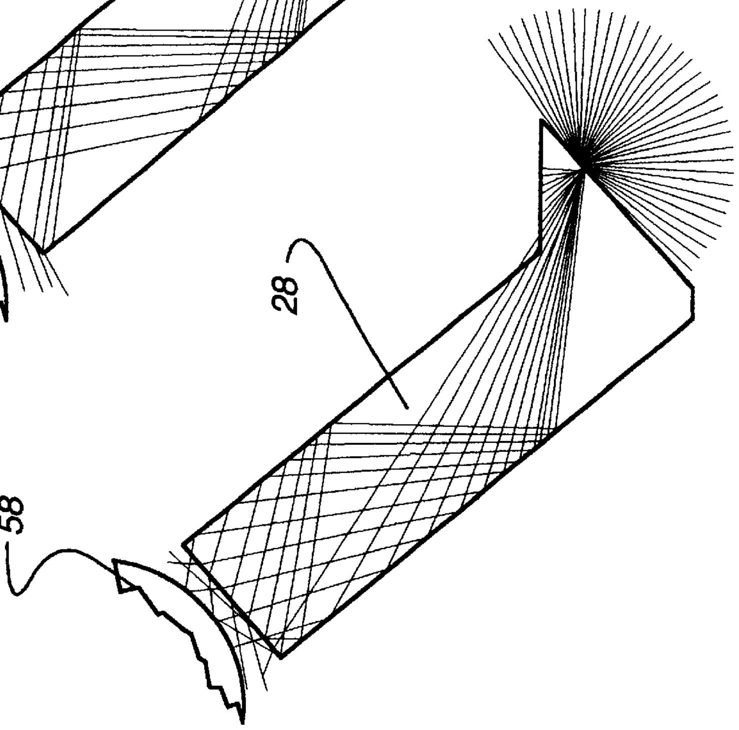
Figures 13D, 13E, 13F:
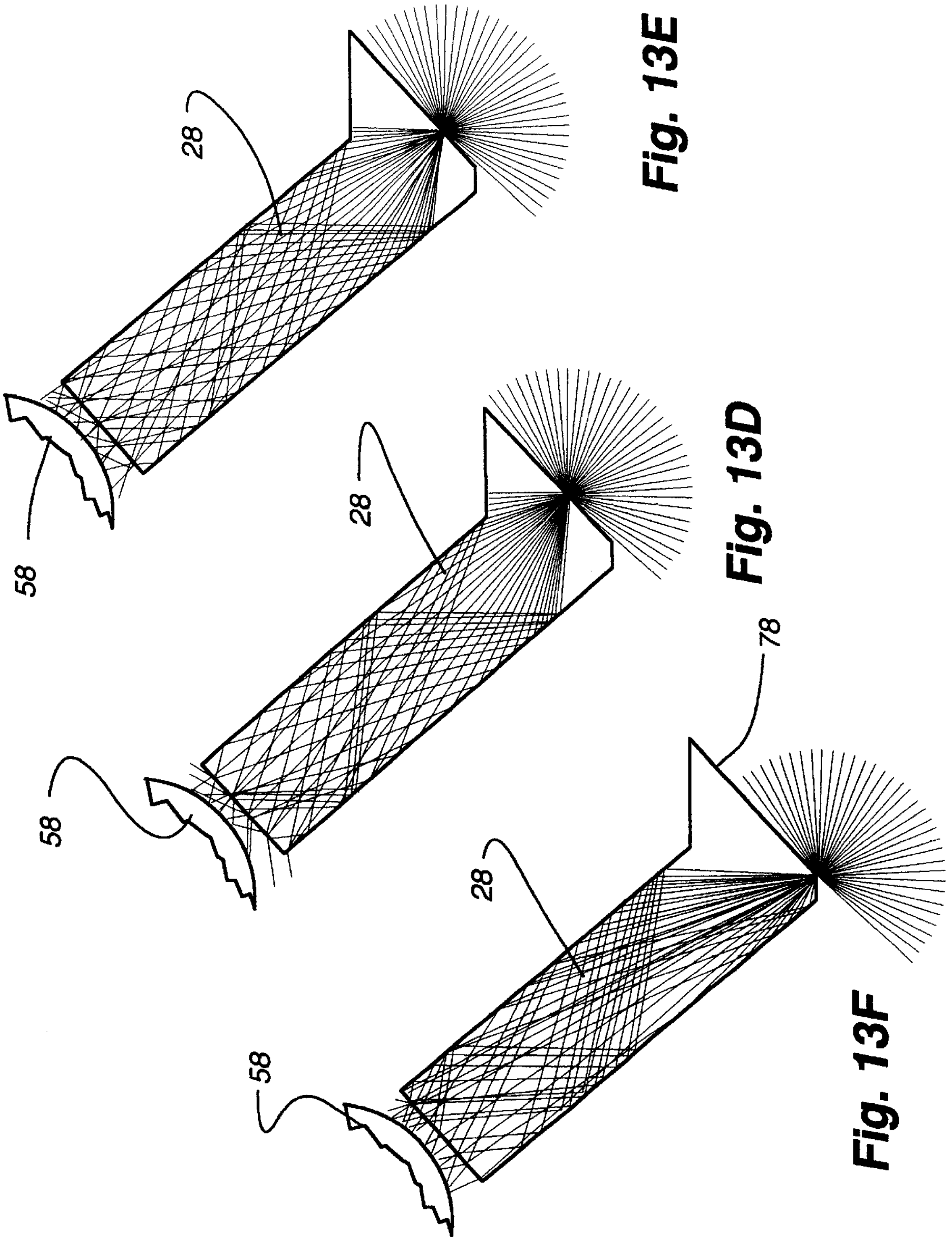

FIGS. 13A–13F are schematic representations of a signal refractor 28 and collector 58. Also shown schematically in each of these figures are a plurality of light rays 76 impinging upon the sloped surface 68 of the signal refractor 28 at various positions. In particular, FIG. 13A shows light rays 76 impinging upon the sloped surface 68 at its upper end. FIGS. 13B–13F, reviewed seriatim, depict the light rays 76 impinging on a point that steadily moves downward along the sloped surface 68 until, in FIG. 13F, the light rays 76 are impinging upon the sloped surface 68 at its lowest point. As clearly shown in FIGS. 13A–13F, a portion of the bound light rays 76 impinge upon the collector 58 no matter where the light rays 76 initially strike the sloped surface of the signal refractor 28. In the preferred embodiment, the sloped surface 68 is smooth, resulting in specular reflection from the surface 68, and forms an angle 78 of approximately 45° with the horizontal when the signal refractor 28 is properly placed within the receiver holder 26. This angle 78 is labeled in FIG. 13F. Thus, as the light path simulations depicted in FIGS. 13A–13F clearly show, the signal strength received by the collector 58 is sufficient to activate the control electronics 66 for the motor that adjusts the covering 12 independent of where the light signals 76 initially strike the sloped surface 68.

Figure 14:
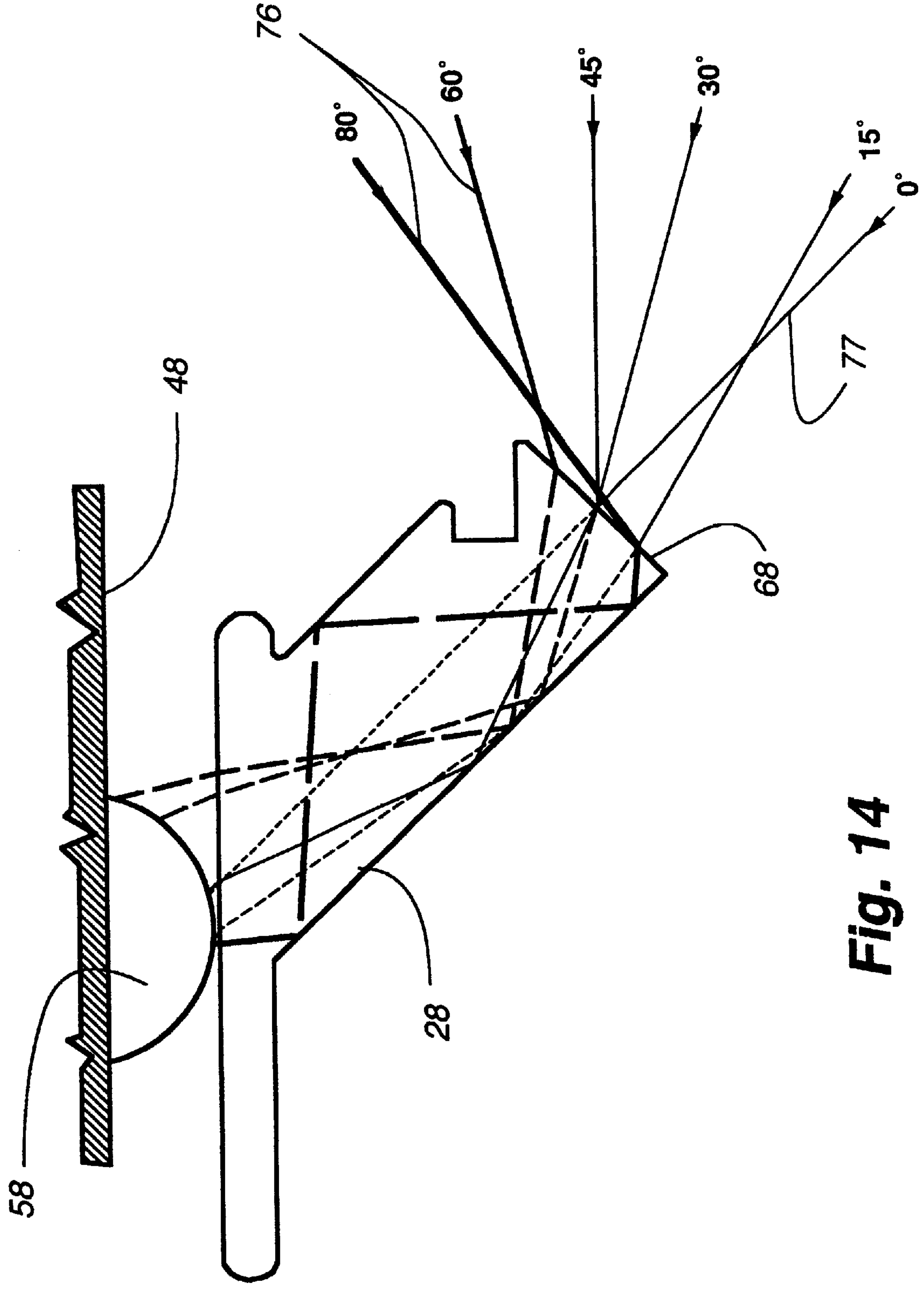
FIG. 14 is similar to FIGS. 13A–13F in that it schematically depicts light rays impinging upon the sloped surface of the signal refractor of FIG. 10 at various angles to illustrate the paths that refracted light follows from the sloped surface of the signal refractor to the collector mounted in the receiver holder base.

FIG. 14 is similar to FIGS. 13A–13F in that it schematically depicts light rays or other signals 76 impinging upon the sloped surface 68 of the signal refractor 28 of FIG. 10 at various angles. This figure illustrates the paths that refracted signals follow from the sloped surface 68 of the signal refractor 28 to the collector 58 mounted in the receiver holder base 48. As shown in FIG. 14, the signal refractor 28, which in the preferred embodiment is made of acrylic having an index of refraction of 1.48, causes the remote control signals 76 to be bent toward the normal (e.g., light ray 77) since the refraction index of air (i.e., 1.0) is less than the refraction index (i.e., 1.48) of the refractor 28. Thus, the refractor 28 effectively channels the signals 76 impinging upon the sloped surface 68 from a wide variety of angles (FIG. 14 depicts 0°, 15°, 30°, 45°, 60°, and 80° as samples) toward the collector 58. As a result, a person operating a remote control device (not shown) to send signals 76 to the signal refractor 28 depicted in FIG. 14 may transmit those signals 76 from a wide variety of positions and still expect to have the signal accurately received by the signal-receiving system 10 of the present invention.

Figure 16:
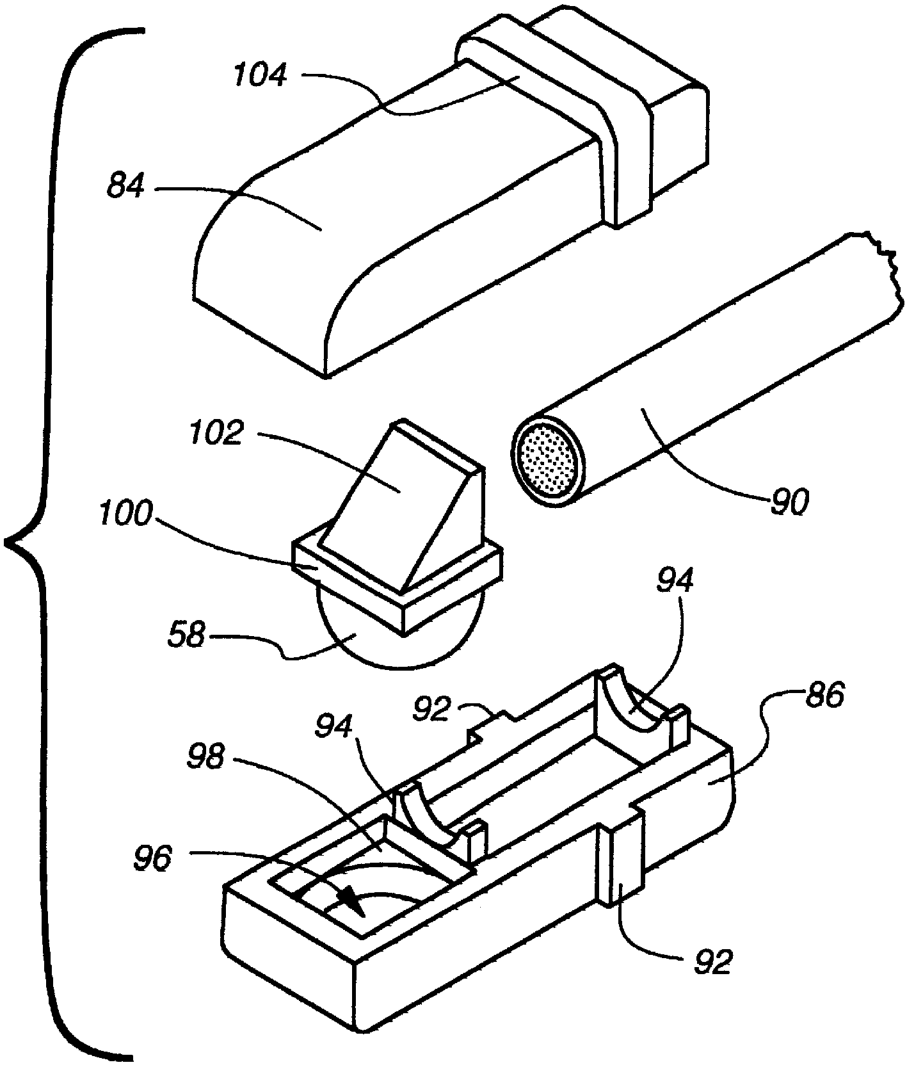
FIG. 16 is an exploded fragmentary isometric view of the remote eye depicted in FIG. 15.
Figure 15:
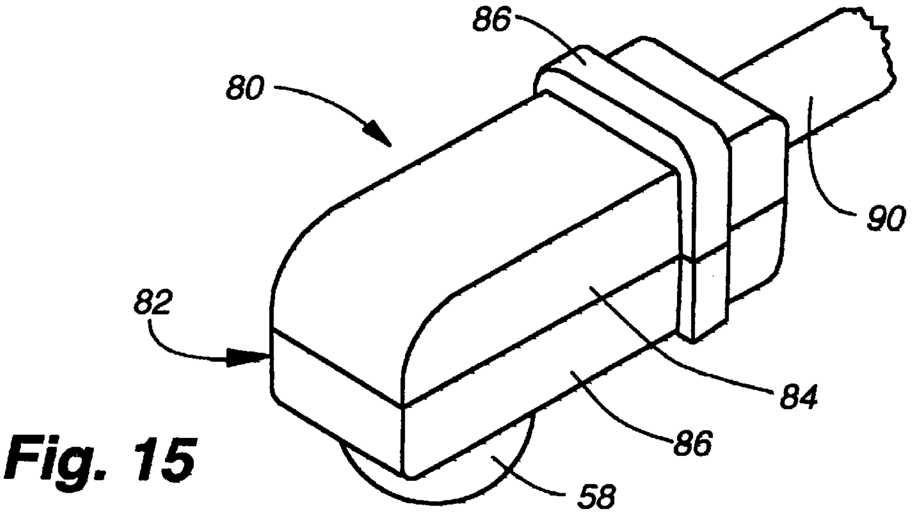
FIG. 15 is an isometric fragmentary view of a remote eye comprising the signal receiver according to an alternative embodiment for the signal-receiving system of the present invention.

Referring next to FIGS. 15 and 16, a remote eye 80 comprising part of an alternative embodiment for the signal-receiving system 10 of the present invention is described next. The assembled remote eye 80 is shown in FIG. 15. In this figure, it is clear that the remote eye 80 comprises a housing having an upper half 84 and a lower half 86. Each of the halves 84, 86 of housing includes part of a rib 88. The collector 58 extends from the lower half 86 of the housing. Also shown in FIG. 15 is a portion of fiber optic cable 90 extending from the rear of the remote eye 80.

FIG. 16 is an exploded fragmentary isometric view of the remote eye 80 depicted in FIG. 15. As shown in FIG. 16, the lower half 86 of the housing includes two rib sections 92. Further, mounted to the bottom of the lower half 86 of the housing are cable cradles 94, which cradle the fiber optic cable 90 when the remote eye 80 is fully assembled. An opening 96 is formed in the bottom of the lower half 86 of the housing. The collector 58 extends through the opening 96 when the remote eye 80 is fully assembled. To keep the collector 58 from passing completely through the lower half 86 of the housing, a collector tray 98 is integrally formed in the lower half 86 of the housing. When the collector 58 is inserted into the opening 96, an enlargement 100 between the collector 58 and a prism 102 rests on the collector tray 98. in the preferred embodiment, the enlargement 100 is substantially square and rests on at least four points on the collector tray 98. The prism 102 directs signals from the collector 58 to an end of the fiber optic cable 90. Once the collected signals are directed into the fiber optic cable 90, they may be routed to the receiver electronics 66 for subsequent processing. The upper half 84 of the remote eye housing is also shown in FIG. 16. As previously described, a rib portion 104 is integrally formed as part of the upper half 84 of the housing. This rib portion 104 cooperates with the rib sections 92 on the lower half 86 of the housing in the fully assembled remote eye 80 depicted in FIG. 15. As will be described next in connection with FIGS. 17 and 18, the complete rib 88, comprising the rib portion 104 of the upper half 84 of the housing and the rib sections 92 of the lower half 86 of the housing, is used to mount the remote eye 80 in its operational position.

Figure 17:
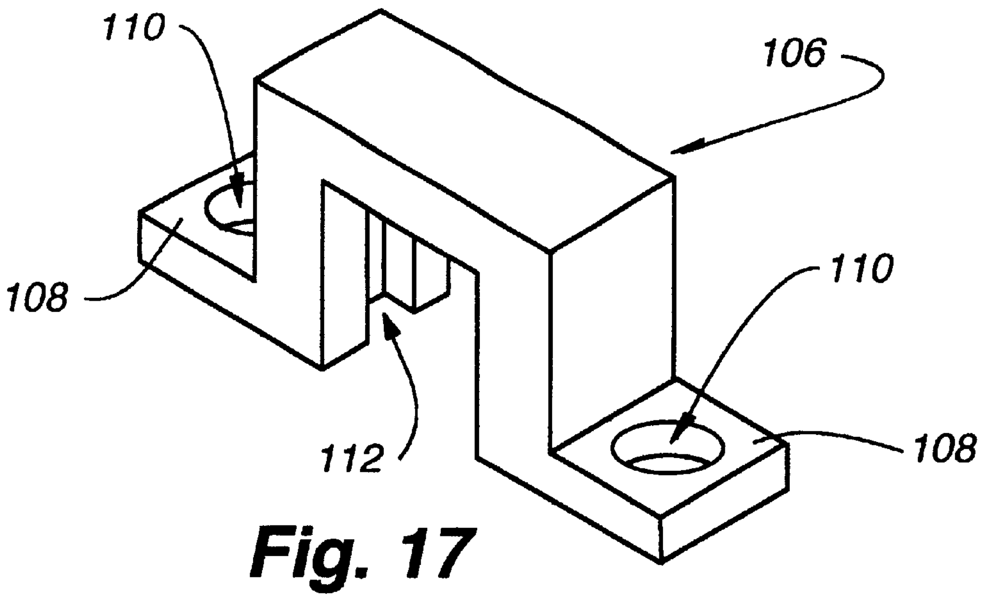
FIG. 17 is an isometric view of a clamp that may be used to attach the remote eye of FIGS. 15 and 16 to a mounting surface.
Figure 18:
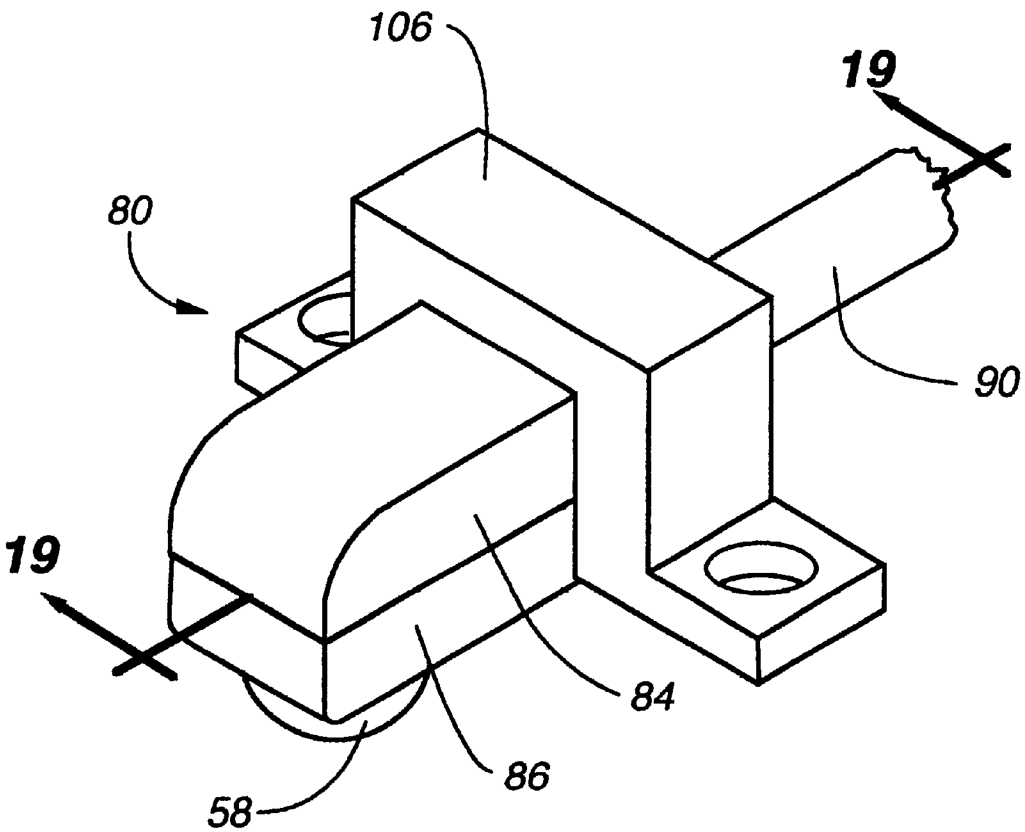
FIG. 18 depicts the clamp of FIG. 17 in position on the assembled remote eye of FIG. 15.
Figure 19:
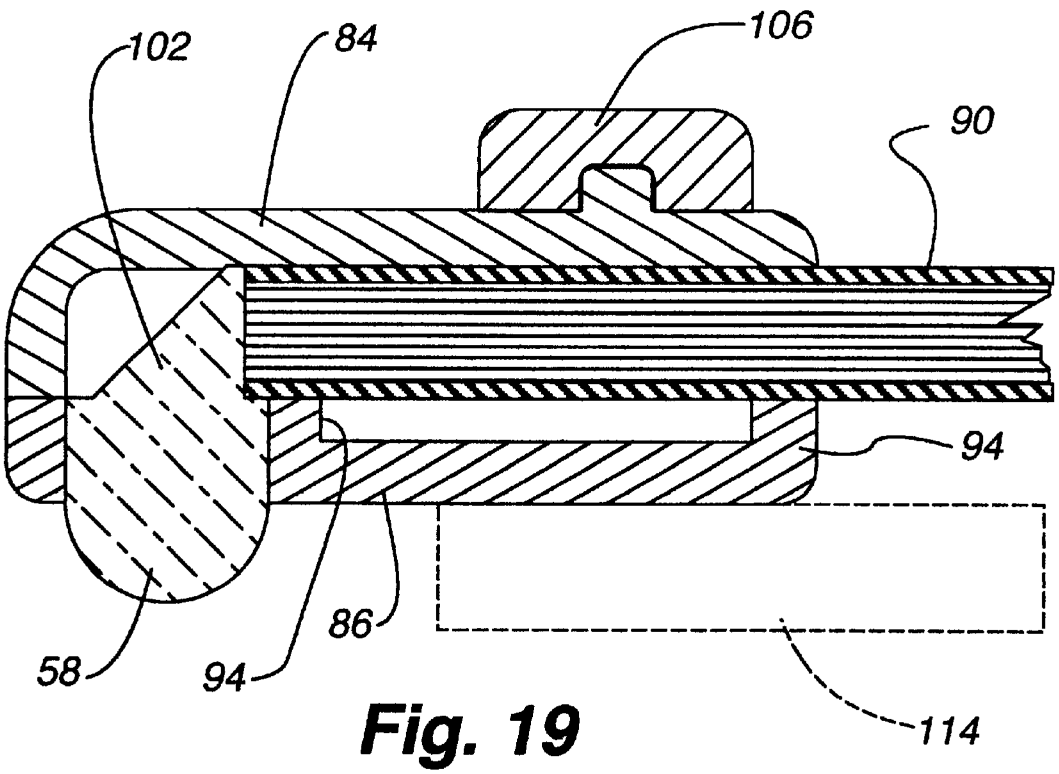
FIG. 19 is a cross-sectional view taken along line 19–19 of FIG. 18, showing the arrangement of the components of the remote eye depicted in FIG. 16 when they are fully assembled and mounted on a wood valance.
Figure 20:
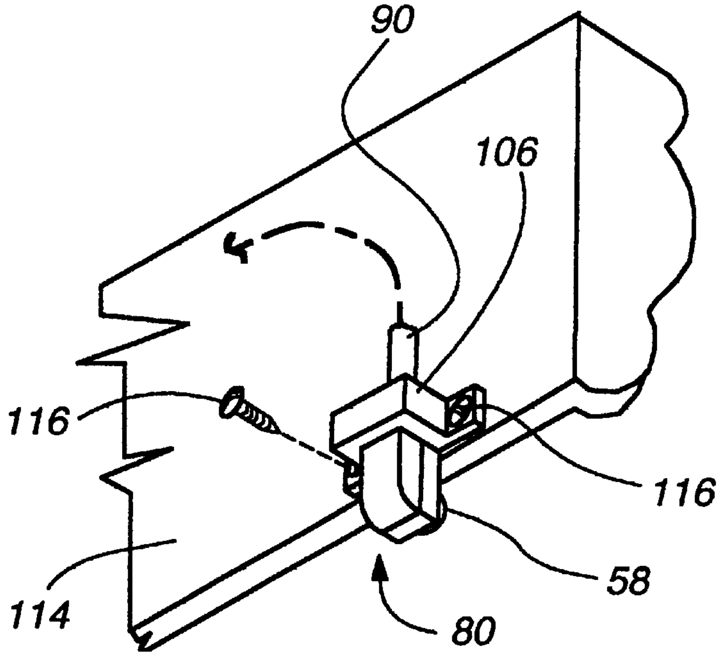
FIG. 20 is a fragmentary isometric view of the assembly depicted in FIG. 18 attached to a wood valance.

Referring next to FIGS. 17 and 18, one means for connecting the remote eye 80 to its operational position is described next. FIG. 17 depicts a clamp 106. In this preferred embodiment, the clamp 106 is substantially U-shaped, with the open portion of the U pointed downwardly in FIG. 17. The clamp 106 includes two extended portions 108. In the preferred embodiment, these extended portions 108 extend substantially perpendicularly to the legs of the U-shaped clamp 106. Each of the extended portions 108 has a screw hole 110 through it. As described below in connection with FIG. 20, these screw holes 110 permit attachment of the clamp 106 to a fixation surface, for example, a wood valance 114 (FIGS. 19 and 20). On an inside surface of the clamp 106, a rib channel 112 is integrally formed. In the preferred embodiment, this rib channel 112 has a configuration that substantially conforms to the rib 88 on the assembled remote eye 80.

Referring now to FIG. 18, assembly of the clamp 106 with the remote eye 80 is described next. In preparation for mounting the remote eye 80 in its operational position, the clamp 106 depicted in FIG. 17 is slid onto the assembled remote eye 80 depicted in FIG. 15. When the clamp 106 is properly positioned onto the remote eye 80, the rib channel 112 formed on the inner surface of the clamp 106 aligns with and accommodates the rib 88 (FIG. 15) on the outside of the remote eye 80. When properly assembly, the clamp 106 rides on the remote eye 80 as shown in FIG. 18. FIG. 19 is a cross-sectional view taken along line 19–19 of FIG. 18. Also shown in FIG. 19 in dashed lines is a wood valance 114 to which the remote eye 80 and clamp 106 are removably affixed. It is clear from FIG. 19 that the prism 102 is mounted immediately adjacent to the free end of the fiber optic cable 90 that is trapped between the upper half 84 of the housing and the cable cradles 94 forming part of the lower half 86 of the housing. When the configuration depicted in FIG. 19 is achieved, signals passing through the collector 58 are directed into the fiber optic cable 90 where they can be transmitted to a signal processor mounted within the headrail housing 18. FIG. 20 is a fragmentary isometric view of the assembly depicted in FIG. 18 attached to the wood valance 114 shown in phantom in FIG. 19 by screws 116. When the remote eye 80 is properly mounted, the collector 58 extends just below the bottom edge of the wood valance 114 so that signals from a hand held or other remote-control device (not shown) can be directed toward the collector 58.

Figure 21:
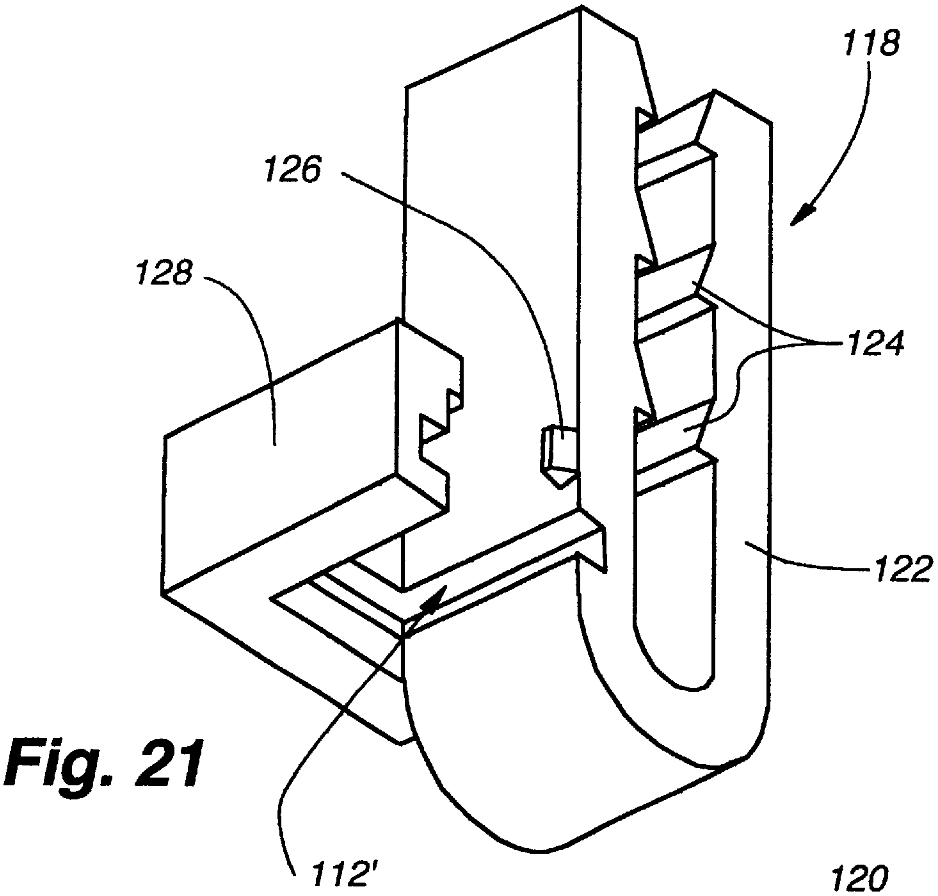
FIG. 21 is an isometric view of a clip that may be used to attach the remote eye depicted in FIGS. 15 and 16 to an over treatment for a window covering.
Figure 22:
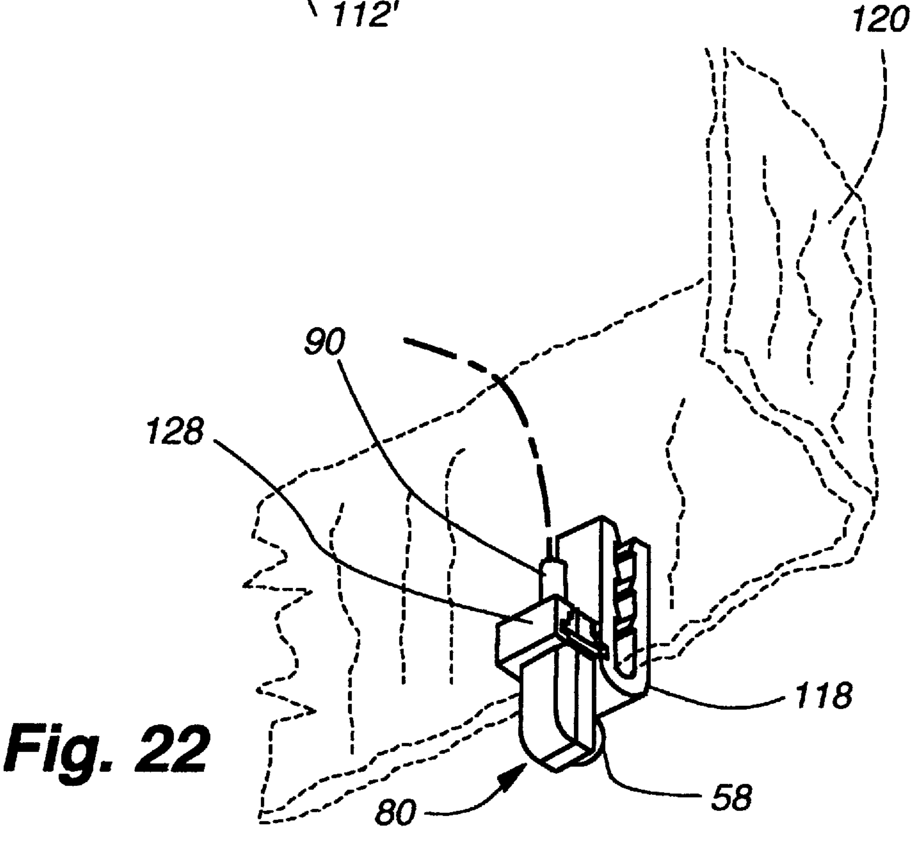
FIG. 22 depicts the clip of FIG. 21 mounting the remote eye of FIG. 15 onto an over treatment shown in phantom to position the collector for receipt of signals from a remote control.

FIG. 21 is an isometric view of a clip 118 that may be used to attach the remote eye 80 depicted to best advantage in FIG. 15 to an over treatment 120 (FIG. 22) for a window covering. The clip 118 comprises a generally U-shaped main body 122. On an inner surface of each leg of the U-shaped main body 122 are a plurality of gripping ridges 124. These gripping ridges 124, which are formed in a known manner, permit easy attachment to the over treatment 120, but resist removal. Since the gripping ridges 124 resist removal, when the clip 118 is mounted in its operational configuration, it tends to remain in a desired position. A retention nub 126 is integrally formed on an outer surface of one of the legs of the U-shaped main body 122. Also mounted on the same leg and adjacent to the retention nub 126 is a flexible brace 128. In the preferred embodiment, the flexible brace 128 includes a rib channel 112' that also extends into the same leg of the U-shaped main body 122 from which the flexible brace 128 extends. When the remote eye 80 depicted in FIG. 15 is attached to the clip 118 depicted in FIG. 21, the rib 88 on the outside of the remote eye 80 is carried within the rib channel 112' depicted in FIG. 21. When the remote eye 80 is fully seated in the rib channel 112', the retention nub 126 snaps past an edge of the remote eye 80, and the flexible brace 128 then cooperates with the retention nub 126 to hold the remote eye 80 in its assembled condition with the clip 118. As shown in FIG. 22, once the remote eye 80 and clip 118 are assembled, the clip 118 may then be slid over the over treatment 120. In this manner, the collector 58 of the remote eye 80 can again be positioned for reliable receipt of signals from a remote-control device (not shown).

Although preferred embodiments of this invention have been described above, those skilled in the art could make numerous alterations to the disclosed embodiments without departing from the spirit or scope of this invention. For example, there are numerous possible configurations for the remote eye housing 82 and the clamp 106 and clip 118 depicted in FIGS. 15–22. Similarly, although the signal refractor 28 depicted in FIG. 10 is the most preferred configuration presently known to the inventors, a wide variety of specific configurations for the signal refractor 28 would work. The signal-receiving system has been described above as being for motorized adjustable coverings for architectural openings. It could, however, be used in other application (e.g., remote-controlled lighting). Further, all directional references, e.g., upper, lower, upward, downward, left, right, leftward, rightward, top, bottom, above, below, vertical, horizontal) above are only used for identification purposes to aid the reader's understanding of the present invention and do not create limitations, particularly as to the position, orientation, or use of the invention. It is intended that all matter contained in the above description or shown in the accompanying drawings shall be interpreted as illustrative and not limiting.

We claim:

1. A signal-receiving system adapted to be removably connected to a headrail housing for motorized covering for an architectural opening, said signal-receiving system comprising receiver electronics;

a receiver holder that supports said receiver electronics and that is adapted to be removably affixed within the headrail housing; and an angled fiber-optic signal refractor operatively connected to said receiver electronics.

2. The signal-receiving system of claim 1, wherein said receiver holder further comprises at least one brace adapted to position said receiver holder within the headrail housing.

3. The signal-receiving system of claim 2, wherein said headrail housing further comprises a rear wall having a distal edge, and wherein said brace comprises a free end adapted to interact with the distal edge of the rear wall to snappingly position said receiver holder within the headrail housing.

4. The signal-receiving system of claim 3, wherein said receiver holder comprises a receiver holder base and a receiver holder cover.

5. The signal-receiving system of claim 1, wherein said signal refractor comprises a first surface at a lower end of said signal refractor, wherein said first surface is sloped relative to the horizontal when said signal refractor is in an operational position.

6. The signal-receiving system of claim 5, wherein said sloped surface of said signal refractor forms an angle of approximately 45° with the horizontal when said signal refractor is in the operational position.

7. The signal-receiving system of claim 5, wherein said signal refractor further comprises a front surface.

8. The signal-receiving system of claim 7, wherein said front surface is sloped relative to the vertical when said signal refractor in the operational position.

9. The signal-receiving system of claim 8, wherein said signal refractor has a index of refraction of 1.48.

10. The signal-receiving system of claim 1, wherein said headrail housing has a front wall with a lowest edge, wherein said receiver holder has a bottom surface, and wherein said signal refractor is removably associated with said bottom surface in a position adjacent to the lowest edge of the front wall.

11. The signal-receiving system of claim 10, wherein said signal refractor further comprising an upper surface having at least one positioning clip extending therefrom, and wherein said at least one positioning clip rests on said bottom surface of said receiver holder to position said signal refractor.

12. The signal-receiving system of claim 10, wherein said signal refractor further comprises a substantially horizontal channel that disengageably receives an inwardly directed substantially horizontal ledge extending from the lowest edge of the front wall of the headrail housing.

13. The signal-receiving system of claim 1, wherein said headrail housing has a front wall with a lowest edge, wherein said receiver holder comprises a receiver holder base and a receiver holder cover, said receiver holder base having a bottom surface with a scoop extending therefrom, and wherein said signal refractor is removably affixed to said scoop in a position adjacent to the lowest edge of the front wall.

14. The signal-receiving system of claim 13 further comprising a collector mounted within the receiver holder base adjacent to said signal refractor.

15. The signal-receiving system of claim 14, wherein said signal refractor further comprises an upper surface, said signal-receiving system further comprising said collector positioned adjacent to said upper surface of said signal refractor; and fiber optic cable operatively associated with said collector and said receiver electronics.

16. The signal-receiving system of claim 13, wherein said receiver holder base has longitudinal ends and said receiver holder cover has corresponding longitudinal ends, said signal-receiving system further comprising a pair of cover anchors extending from said longitudinal ends of said receiver holder base; and a pair of catches extending downwardly from said longitudinal ends of said receiver holder cover such that when said receiver holder cover is pressed into position on said receiver holder base, said catches snap past said cover anchors to removably secure said receiver holder cover to said receiver holder base.

17. The signal-receiving system of claim 1, wherein said headrail housing has a front wall with a lowest edge, wherein said receiver holder comprises a receiver holder base and a receiver holder cover, said receiver holder base having a bottom surface, and wherein said signal refractor is removably affixed to said bottom surface in a position adjacent to the lowest edge of the front wall.

18. The signal-receiving system of claim 1, wherein said headrail housing has a bottom wall with a port through it, and wherein said receiver holder further comprises a bottom surface having a scoop extending therefrom such that when said receiver holder is removably affixed within the headrail housing, said scoop extends through the port in the bottom wall of the headrail housing.

19. The signal-receiving system of claim 18, wherein said signal refractor is mounted within said scoop so as to extend outside of the headrail housing.

20. A signal receiving system adapted to be removably connected to a headrail housing for a motorized covering for an architectural opening, said signal-receiving system comprising:

receiver electronics;

a receiver holder that supports said receiver electronics and that is adapted to be removably affixed within the headrail housing;

an over-treatment substantially concealing the headrail housing; and a signal receiver operatively connected to said receiver electronics, said signal receiver comprising a remote eye removably affixed to the over-treatment.

21. The signal-receiving system of claim 20, wherein said remote eye comprises a housing; and a collector positioned within said housing.

22. The signal-receiving system of claim 21, wherein said housing comprises an upper half and a lower half, and wherein said collector extends outwardly from said lower half of said housing.

23. The signal-receiving system of claim 22, wherein said lower half of said housing further comprises at least one cable cradle for removably supporting a portion of fiber optic cable extending into said remote eye.

24. The signal-receiving system of claim 22, wherein each of said halves of said housing including at least one rib portion.

25. The signal-receiving system of claim 24, wherein said lower half of said housing has two rib sections thereon, and said upper half of said housing has a rib portion thereon, whereby a complete rib is formed from said two rib sections and said rib portion when said housing is assembled.

26. The signal-receiving system of claim 25 further comprising a generally U-shaped clamp.

27. The signal-receiving system of claim 26, wherein said U-shaped clamp further comprises two extended portions, each of said extended portions having a screw hole therethrough.

28. The signal-receiving system of claim 26, wherein said U-shaped clamp has an inside surface and further comprises a rib channel integrally formed on said inside surface, said rib channel having a configuration that substantially conforms to a corresponding configuration of said compete rib.

29. The signal-receiving system of claim 25 further comprising a clip having a generally U-shaped main body said clip adapted to removably attach said remote eye to the over treatment.

30. The signal-receiving system of claim 29, wherein said main body of said clip comprises a pair of legs, each having an inner surface and wherein a plurality of gripping ridges exist on said inner surface of said legs.

31. The signal-receiving system of claim 30, wherein a retention nub is integrally formed on an outer surface of one of said legs of said main body.

32. The signal-receiving system of claim 31, wherein a flexible brace is mounted on said one of said legs adjacent to said retention nub.

33. The signal-receiving system of claim 32, wherein a rib channel is formed in a first portion of said flexible brace and a second portion of said one of said legs of said main body, and wherein said rib channel accommodates said complete rib on said remote eye.

34. The signal-receiving system of claim 22, wherein said lower half of said housing has an opening therethrough, and wherein said collector extends outwardly through said opening.

35. The signal-receiving system of claim 34, wherein said lower half of said housing defines a collector tray preventing said collector from passing completely through said opening in said lower half of said housing.

36. The signal-receiving system of claim 35, wherein an enlargement exists on a top of said collector, and wherein said enlargement rests on said collector tray when said collector is installing in said lower half of said housing.

37. The signal-receiving system of claim 34, wherein a prism exists on a top of said enlargement and rests adjacent to an end of a portion of fiber optic cable extending into said housing of said remote eye.

38. A signal-receiving system adapted to be removably connected to a headrail housing for a motorized covering for an architectural opening, said signal-receiving system comprising:

receiver electronics located within said headrail;

a receiver holder that supports said receiver electronics and that is adapted to be removably affixed within the headrail housing; and an optical conduit operatively connected to said receiver electronics, said optical conduit conducting a light signal from the exterior of the headrail to said receiver electronics.

39. The signal-receiving system of claim 38, wherein said optical conduit comprises a signal refractor adapted to be removably mounted to the headrail housing.

40. The signal-receiver system of claim 39, wherein signal refractor comprises an upper end located within the headrail, said system further comprising a signal collector positioned at the upper end of said signal refractor.

41. The signal-receiving system of claim 39, wherein said optical conduit comprises an angled fiber-optic signal refractor.

* * * * *